(12) United States Patent
Wong et al.

(10) Patent No.: US 7,198,029 B1
(45) Date of Patent: Apr. 3, 2007

(54) EXTENSION OF DOD OPERATION IN TORQUE CONTROL SYSTEM

(75) Inventors: Kevin C. Wong, Ann Arbor, MI (US); Alfred E. Spitza, Jr., Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/362,673

(22) Filed: Feb. 27, 2006

(51) Int. Cl.
*F02D 17/02* (2006.01)
*F02D 13/06* (2006.01)

(52) U.S. Cl. .................... 123/350; 123/481; 123/198 F; 701/112

(58) Field of Classification Search ................ 123/399, 123/350, 332, 481, 90.15, 198 DB, 198 DC, 123/198 F; 701/112
See application file for complete search history.

(56) References Cited

U.S. PATENT DOCUMENTS

| | | | | |
|---|---|---|---|---|
| 6,619,258 B2 * | 9/2003 | McKay et al. | ............... | 123/350 |
| 6,655,353 B1 * | 12/2003 | Rayl | ........................... | 123/436 |
| 6,876,918 B2 * | 4/2005 | Kabe et al. | .................. | 701/110 |
| 2004/0069272 A1 * | 4/2004 | Allen et al. | ............. | 123/406.23 |

\* cited by examiner

*Primary Examiner*—Hai Huynh
(74) *Attorney, Agent, or Firm*—Christopher DeVries

(57) ABSTRACT

An engine control system for regulating a torque output of a variable displacement engine includes a first module that calculates a torque modification term based on an engine operating parameter and a second module that determines a desired engine torque and an estimated engine torque. A third module modifies the desired engine torque based on the torque modification term to provide a modified desired engine torque and a fourth module regulates an engine torque output based on the modified desired engine torque and the estimated engine torque when the engine is operating in a deactivated mode.

27 Claims, 4 Drawing Sheets

EXTENSION OF DOD OPERATION IN TORQUE CONTROL SYSTEM

FIELD OF THE INVENTION

The present invention relates to displacement on demand (DOD) internal combustion engines, and more particularly to extending operation of a DOD engine in a deactivated mode.

BACKGROUND OF THE INVENTION

Internal combustion engines generate drive torque that is transferred to a drivetrain via a crankshaft. Some internal combustion engines include engine control systems that deactivate cylinders under low load situations. For example, an eight cylinder engine can be operated using four cylinders to improve fuel economy by reducing pumping losses. This process is generally referred to as displacement on demand or DOD. Operation using all of the engine cylinders is referred to as an activated mode. A deactivated mode refers to operation using less than all of the cylinders (i.e., one or more cylinders not active).

The engine is controlled using a torque control system that regulates engine operating parameters including, but not limited to, airflow into the engine, electronic spark timing, fueling and the activation or deactivation of the cylinders. The torque control system regulates these engine operating parameters based on the various engine operation inputs and a driver requested engine torque.

In existing torque control systems, various sub-systems regulate engine operation. For example, the throttle controls engine intake manifold pressure (i.e., air load) and airflow, the electronic spark control controls the spark timing and fuel injectors meter fueling. In combination, these sub-systems regulate the engine torque output. Assuming that fueling is fixed at a stoichiometric ratio for emissions control, fueling cannot be used to control torque in a normal operating mode. This leaves airflow, air load and spark timing as the sub-systems that can regulate engine output torque.

Some engines implement a spark knock limit (i.e., a maximum spark advance that keeps the engine from knocking) that is determined based on cylinder air load. In a deactivated mode, high cylinder air loads are achieved and the spark timing is greatly retarded to prevent knock. As the spark timing is retarded further from the maximum spark for best torque value (MBT), the engine's torque output decreases. As a result, the throttle is opened to increase the load in order to keep the engine torque output constant. However, as the throttle opens, air load is increased and the spark timing is further retarded. This cycle continues until the engine is fully un-throttled and must return to the activated mode (i.e., operating on all cylinders). At this point, any efficiency gains that result from operating in the deactivated mode are lost.

SUMMARY OF THE INVENTION

Accordingly, the present invention provides an engine control system for regulating a torque output of a variable displacement engine. The engine control system includes a first module that calculates a torque modification term based on an engine operating parameter and a second module that determines a desired engine torque and an estimated engine torque. A third module modifies the desired engine torque based on the torque modification term to provide a modified desired engine torque and a fourth module regulates an engine torque output based on the modified desired engine torque and the estimated engine torque when the engine is operating in a deactivated mode.

In another feature, the third module modifies the estimated engine torque to provide a modified estimated engine torque. The fourth module regulates the engine torque output based on the modified estimated engine torque.

In another feature, the torque modification term includes one of a torque gain and a torque offset.

In another feature, the engine operating parameter includes one of a spark timing and a cam phaser position.

In another feature, the fourth module regulates the engine torque output based on the desired engine torque and the estimated engine torque when the engine is operating in an activated mode.

In other features, the engine control system further includes a fifth module that regulates operation of a vehicle system based on the estimated engine torque while the fourth module regulates the engine output torque based on the modified desired engine torque and a modified estimated engine torque during engine operation in the deactivated mode. The vehicle system includes a transmission.

In still another feature, the desired engine torque is determined based on an accelerator pedal input.

In yet another feature, the estimated engine torque is determined based on engine operating parameters.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
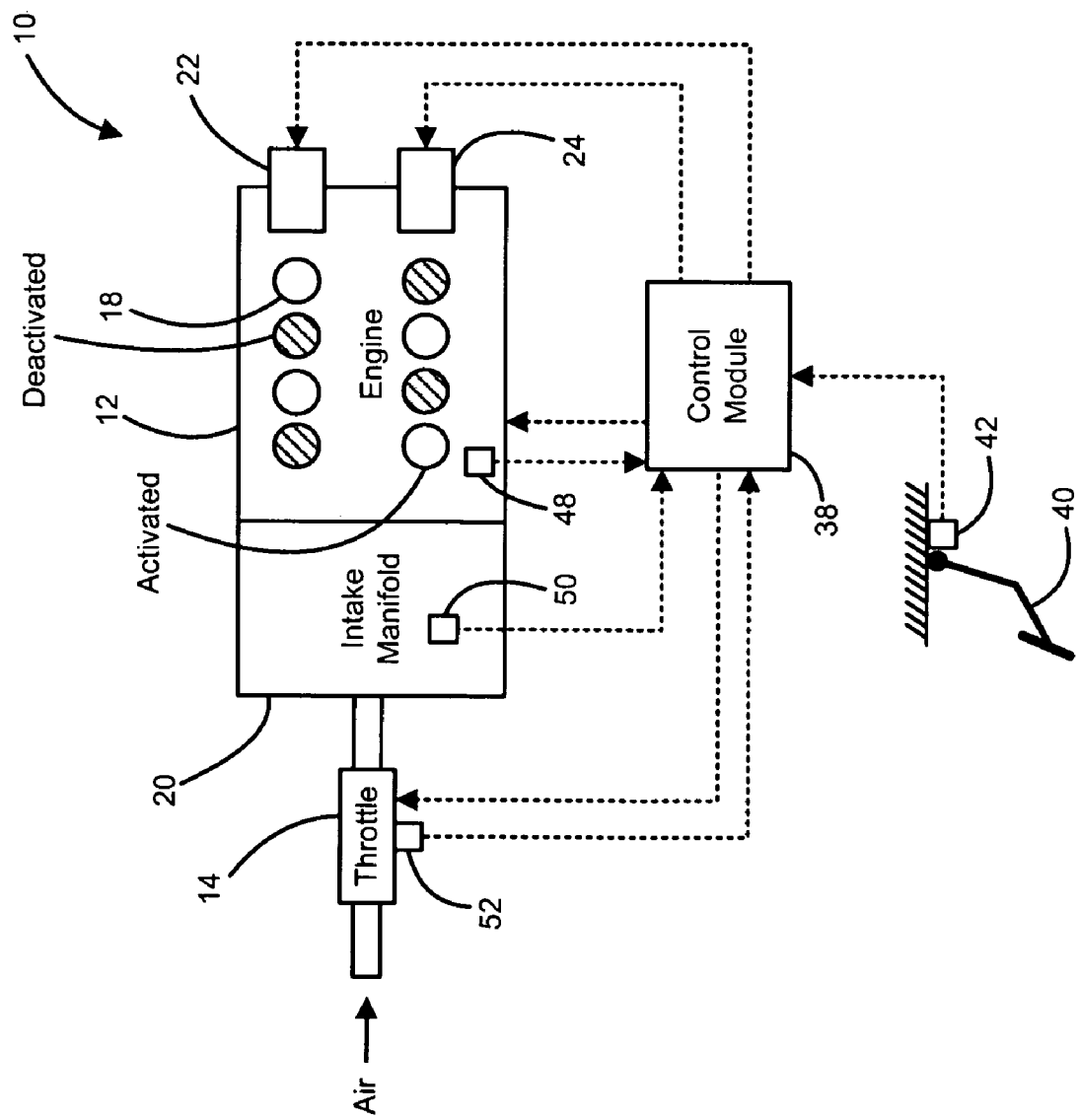
FIG. 1 is a functional block diagram of an exemplary engine system that is regulated based on the DOD torque control of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, activated refers to operation using all of the engine cylinders. Deactivated refers to operation using less than all of the cylinders of the engine (one or more cylinders not active).

Referring now to FIG. 1, a vehicle 10 includes an engine 12 that generates drive torque. Air flows into the engine 12 through a throttle 14. The engine 12 includes N cylinders 18. One or more of the cylinders 18 are selectively deactivated during engine operation. Although FIG. 1 depicts eight cylinders (N=8), it is appreciated that the engine 12 may include additional or fewer cylinders 18. For example, engines having 4, 5, 6, 8, 10, 12 and 16 cylinders are contemplated. Air flows into the engine 12 through an intake manifold 20 and is combusted with fuel in the cylinders 18. The combustion process reciprocally drives pistons (not shown) within the cylinders 18. The pistons rotatably drive a crankshaft (not shown) to provide drive torque to the powertrain. The engine 12 can also include intake and/or exhaust cam phasers 22, 24, respectively that adjust the timing of intake and exhaust valve opening relative to the position of the piston within the cylinder (i.e., crankshaft angle). In this manner, the cam phasers 22, 24 can regulate the amount of charge air that is trapped in the cylinder as well as the amount of exhaust gas exhausted from the cylinder.

A control module 38 communicates with the engine 12 and various inputs and sensors as described herein. A vehicle operator manipulates an accelerator pedal 40 to regulate the throttle 14. More particularly, a pedal position sensor 42 generates a pedal position signal that is communicated to the control module 38. An engine speed sensor 48 generates a signal based on engine speed. An intake manifold absolute pressure (MAP) sensor 50 generates a signal based on a pressure of the intake manifold 20. A throttle position sensor (TPS) 52 generates a signal based on throttle position. The control module 38 determines a control or desired engine torque output ($T_{DES}$) based on the pedal position signal. The control module 38 also calculates an actual or estimated engine torque output ($T_{EST}$) and regulates the engine torque output using a closed-loop control (e.g., PID control) based on $T_{DES}$ and $T_{EST}$.

When light engine load occurs, the control module 38 transitions the engine 12 to the deactivated mode. In an exemplary embodiment, N/2 cylinders 18 are deactivated, although one or more cylinders may be deactivated. Upon deactivation of the selected cylinders 18, the control module 38 increases the power output of the remaining or activated cylinders 18. The inlet and exhaust ports (not shown) of the deactivated cylinders 18 are closed to reduce pumping losses.

The engine load is determined based on the intake MAP, cylinder mode and engine RPM. More particularly, if the MAP is below a threshold level for a given RPM, the engine load is deemed light and the engine 12 is operated in the deactivated mode. If the MAP is above the threshold level for the given RPM, the engine load is deemed heavy and the engine 12 is operated in the activated mode.

The DOD torque control of the present invention reduces the sensitivity of the torque control due to the knock-limitedness of the engine 12 and the throttle opening tendency to extend engine operation in the deactivated mode. More specifically, if the engine 12 is not operating in the deactivated mode, $T_{DES}$ and $T_{EST}$ are determined as normal. For example, $T_{DES}$ can be calculated based on engine operating parameters including, but not limited to engine RPM, MAP, spark timing, cam phaser position, as well as the driver's input via the accelerator pedal 40. $T_{EST}$ is determined based on a pre-programmed mathematical model based on the above-identified engine operating parameters. If the engine 12 is operating in the deactivated mode, a torque modification term or terms are determined and $T_{DES}$ is modified based on the torque modification term(s) to provide a modified control or desired torque ($T'_{DES}$).

The modification term(s) is/are determined from a look-up table or a plurality of look-up tables based on engine operating parameters including, but not limited to, the ignition timing (i.e., spark advance) and/or the intake and/or exhaust cam phaser position. The modification term(s) include a gain, an offset or both a gain and an offset. For example, $T'_{DES}$ can be determined by multiplying $T_{DES}$ by a gain, by subtracting/adding a torque offset to $T_{DES}$ or by multiplying $T_{DES}$ by a gain and subtracting/adding a torque offset.

In the deactivated mode, the DOD torque control performs closed-loop torque control based on $T'_{DES}$ and $T'_{EST}$. The DOD torque control concurrently uses $T_{EST}$ (i.e., the unmodified actual or estimated engine torque) for parallel running algorithms. For example, $T_{EST}$ can be used to regulate transmission line pressure during a gear shift, while $T'_{EST}$ is concurrently used to regulate engine torque output.

Figure 2:
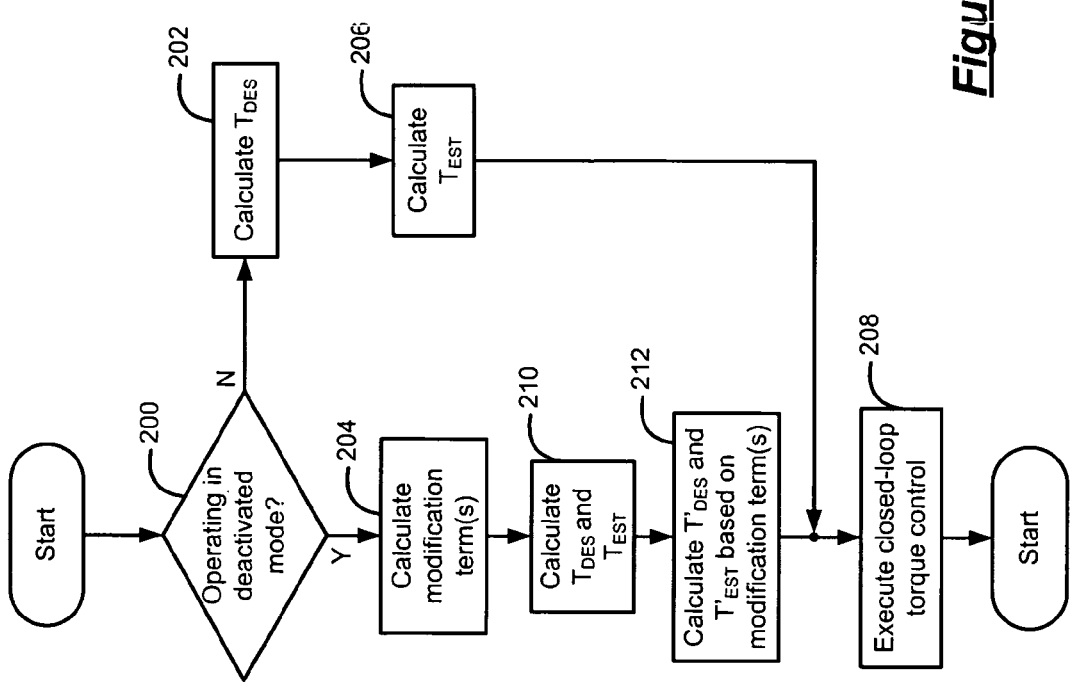
FIG. 2 is a flowchart illustrating exemplary steps executed by the DOD torque control of the present invention.

Referring now to FIG. 2, exemplary steps that are executed by the engine torque control system will be described in detail. In step 200, control determines whether the engine is operating in the deactivated mode. If the engine is not operating in the deactivated mode, control continues in step 202. If the engine is operating in the deactivated mode, control continues in step 204. In steps 202 and 206, control calculates $T_{DES}$ and $T_{EST}$ in a traditional manner. In step 208, control executes the closed-loop torque control based on $T_{DES}$ and $T_{EST}$, and control ends.

In step 204, control determines the modification term(s) based on engine operating parameters including, but not limited to, spark timing and/or cam phaser position. In step 210, control calculates $T_{DES}$ and $T_{EST}$ in a traditional manner. In step 212, control determines $T'_{DES}$ and $T'_{EST}$ based on $T_{DES}$, $T_{EST}$ and the modification term(s). In this manner, $T_{EST}$ is calculated in parallel for external algorithm use (e.g., transmission control) and to ensure that the closed-loop torque control is not affected by the modification. In step 208, control executes the closed-loop torque control based on $T'_{DES}$ and $T'_{EST}$, and control ends. In this manner, the closed-loop torque control is based on $T'_{DES}$ and $T'_{EST}$ when operating in the deactivated mode and is based on $T_{DES}$ and $T_{EST}$ when operating in the activated mode.

Figure 3:
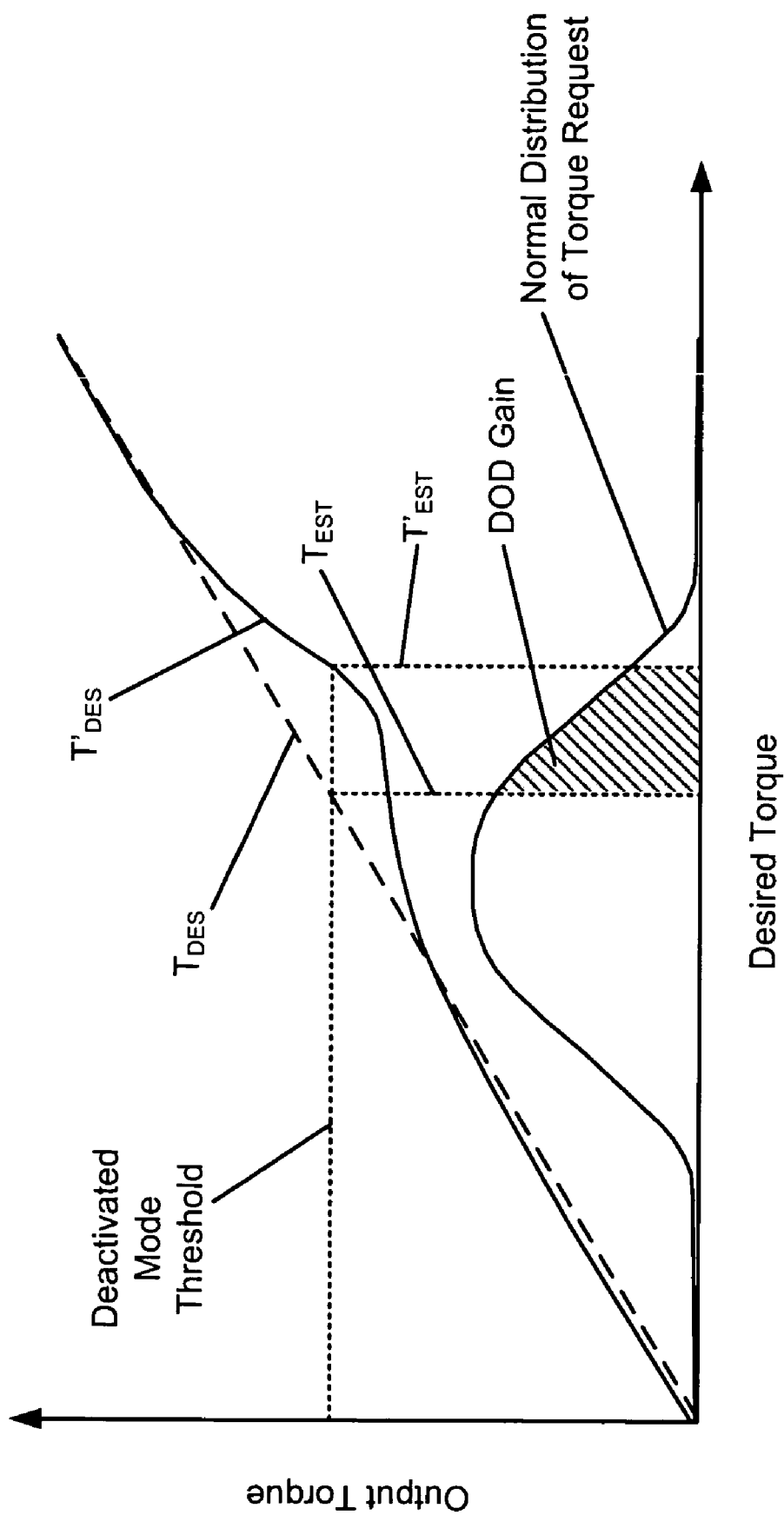
FIG. 3 is a graph illustrating an extended DOD gain that is achieved using the DOD torque control of the present invention.

Referring now to FIG. 3, a graph illustrates an extended DOD gain that is achieved using the DOD torque control of the present invention. More specifically, the DOD torque control extends engine operation in the deactivated mode by regulating the engine torque output based on $T'_{DES}$, which remains below the deactivated mode torque threshold (i.e., the torque at which engine operation transitions to the activated mode) for a longer period of time than would be possible if regulating the engine torque output based on $T_{DES}$. In this manner, a significant portion of the normal distribution of a driver torque request is gained while operating in the deactivated mode and a corresponding increase in fuel economy is achieved by extending operation in the deactivated mode.

Figure 4:
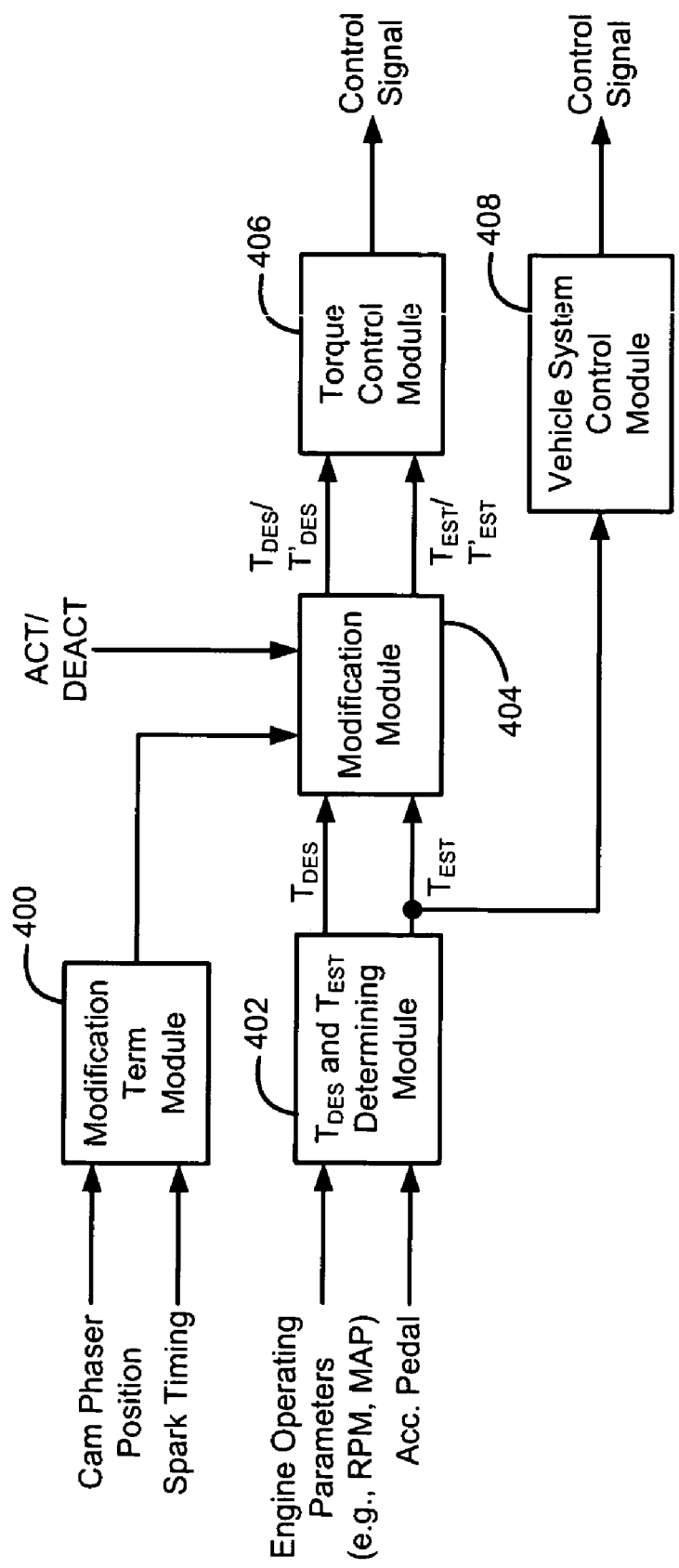
FIG. 4 is a functional block diagram of exemplary modules that execute the DOD torque control of the present invention.

Referring now to FIG. 4, exemplary modules that execute the DOD torque control will be described in detail. The exemplary modules include a modification term module 400, a $T_{DES}$ and $T_{EST}$ determining module 402, a modification module 404, a torque control module 406 and a vehicle system control module 408. The modification term module 400 determines a modification term or terms (e.g., a torque offset and/or gain) based on engine operating parameters (e.g., spark timing and/or cam phaser position). The modification term(s) is/are output to the modification module 404. The $T_{DES}$ and $T_{EST}$ determining module 402 determines $T_{DES}$ and $T_{EST}$ based on engine operating parameters (e.g., MAP, RPM and/or accelerator pedal position) and outputs $T_{DES}$ and $T_{EST}$ to the modification module 404. $T_{EST}$ is also output to the vehicle system control module 408.

The modification module 404 modifies $T_{DES}$ and $T_{EST}$ based on the modification term(s) and an activated (ACT) or deactivated (DEACT) signal to provide $T'_{DES}$ and $T'_{EST}$. More specifically, if the modification module 404 receives the DEACT signal (i.e., engine is operating in the deactivated mode), the modification module 404 outputs $T'_{DES}$ and $T'_{EST}$ to the torque control module 406. If the modification module 404 receives the ACT signal (i.e., engine is operating in the activated mode), the modification module 404 outputs $T_{DES}$ and $T_{EST}$. It is alternatively anticipated that the modification term module 400 can receive the ACT/DEACT signals. If the modification term module 400 receives the ACT signal, the modification term(s) is/are set to 0, if an offset, and/or is set to 1, if a gain. In this manner, the modification term does not affect $T_{DES}$ or $T_{EST}$ in the modification module 404 while the engine is operating in the activated mode.

The torque control module 406 generates engine control signals based on $T_{DES}$ and $T_{EST}$, if the engine is operating in the activated mode, or T'DES and $T'_{EST}$, if the engine is operating in the deactivated mode. The vehicle system control module 408 generates vehicle system control signals based on $T_{EST}$. The controlled vehicle system can include a transmission, for example.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system for regulating a torque output of a variable displacement engine, comprising:
   a first module that calculates a torque modification term based on an engine operating parameter;
   a second module that determines a desired engine torque and an estimated engine torque;
   a third module that modifies said desired engine torque based on said torque modification term to provide a modified desired engine torque; and
   a fourth module that regulates an engine torque output based on said modified desired engine torque and said estimated engine torque when said engine is operating in a deactivated mode.

2. The engine control system of claim 1 wherein said third module modifies said estimated engine torque to provide a modified estimated engine torque, wherein fourth module regulates said engine torque output based on said modified estimated engine torque.

3. The engine control system of claim 1 wherein said torque modification term includes one of a torque gain and a torque offset.

4. The engine control system of claim 1 wherein said engine operating parameter includes one of a spark timing and a cam phaser position.

5. The engine control system of claim 1 wherein said fourth module regulates said engine torque output based on said desired engine torque and said estimated engine torque when said engine is operating in an activated mode.

6. The engine control system of claim 1 further comprising a fifth module that regulates operation of a vehicle system based on said estimated engine torque while said fourth module regulates said engine output torque based on said modified desired engine torque and a modified estimated engine torque during engine operation in said deactivated mode.

7. The engine control system of claim 6 wherein said vehicle system includes a transmission.

8. The engine control system of claim 1 wherein said desired engine torque is determined based on an accelerator pedal input.

9. The engine control system of claim 1 wherein said estimated engine torque is determined based on engine operating parameters.

10. A method of regulating a torque output of a variable displacement engine, comprising:
    calculating a torque modification term based on an engine operating parameter;
    determining a desired engine torque and an estimated engine torque;
    modifying said desired engine torque based on said torque modification term to provide a modified desired engine torque; and
    regulating an engine torque output based on said modified desired engine torque and said estimated engine torque when said engine is operating in a deactivated mode.

11. The method of claim 10 further comprising modifying said estimated engine torque to provide a modified estimated engine torque, wherein said engine torque output is regulated based on said modified estimated engine torque.

12. The method of claim 10 wherein said torque modification term includes one of a torque gain and a torque offset.

13. The method of claim 10 wherein said engine operating parameter includes one of a spark timing and a cam phaser position.

14. The method of claim 10 further comprising regulating said engine torque output based on said desired engine torque and said estimated engine torque when said engine is operating in an activated mode.

15. The method of claim 10 further comprising regulating operation of a vehicle system based on said estimated engine torque while regulating said engine output torque based on said modified desired engine torque and a modified estimated engine torque during engine operation in said deactivated mode.

16. The method of claim 15 wherein said vehicle system includes a transmission.

17. The method of claim 10 wherein said desired engine torque is determined based on an accelerator pedal input.

18. The method of claim 10 wherein said estimated engine torque is determined based on engine operating parameters.

19. A method of regulating a torque output of a variable displacement engine to extend engine operation in a deactivated mode, comprising:
    determining a desired engine torque and an estimated engine torque;
    determining whether said engine is operating in said deactivated mode;
    calculating a torque modification term based on an engine operating parameter when said engine is operating in said deactivated mode;
    modifying said desired engine torque based on said torque modification term to provide a modified desired engine torque; and regulating an engine torque output based on said modified desired engine torque and said estimated engine torque when said engine is operating in a deactivated mode.

20. The method of claim 19 further comprising modifying said estimated engine torque to provide a modified estimated engine torque, wherein said engine torque output is regulated based on said modified estimated engine torque.

21. The method of claim 19 wherein said torque modification term includes one of a torque gain and a torque offset.

22. The method of claim 19 wherein said engine operating parameter includes one of a spark timing and a cam phaser position.

23. The method of claim 19 further comprising regulating said engine torque output based on said desired engine torque and said estimated engine torque when said engine is operating in an activated mode.

24. The method of claim 19 further comprising regulating operation of a vehicle system based on said estimated engine torque while regulating said engine output torque based on said modified desired engine torque and a modified estimated engine torque during engine operation in said deactivated mode.

25. The method of claim 24 wherein said vehicle system includes a transmission.

26. The method of claim 19 wherein said desired engine torque is determined based on an accelerator pedal input.

27. The method of claim 19 wherein said estimated engine torque is determined based on engine operating parameters.

* * * * *